ately. The two friction surfaces 4 and 5 face one another and constitute the above-mentioned first and second friction surfaces. Between the two parts of the annular casing is bolted a ring 6 which projects radially inwardly

United States Patent Office 2,801,719
Patented Aug. 6, 1957

2,801,719

ELECTRO-MAGNETICALLY ACTUATED FRICTION CLUTCH AND BRAKE

Robert Cecil Clerk, Richmond, England, assignor to Gyreacta Transmissions Limited, London, England Application October 21, 1955, Serial No. 542,018

Claims priority, application Great Britain October 25, 1954

1 Claim. (Cl. 192—35)

The invention relates to friction clutches and brakes of the type in which an annular electro-magnet and an annular armature are disposed coaxially and are relatively displaceable in the axial direction of the clutch or brake, engagement of the main friction elements of the clutch or brake being initiated by energising the electro-magnet so as to attract the armature.

The object of the invention is to provide an improved clutch or brake of this type.

A clutch or brake according to the invention comprises two relatively rotatable elements, one of which is provided with first and second friction surfaces disposed co-axially and spaced apart, a cage disposed between said first and second friction surfaces, a first presser plate disposed between said cage and said first friction surface, and a second presser plate disposed between said cage and said second friction surface, said cage carrying cams or balls which co-operate with camming faces on said presser plates whereby to displace said presser plates axially towards said first and second friction surfaces respectively upon relative angular movement between said cage and said presser plates, said presser plates carrying an annular electro-magnet disposed coaxially with respect to said rotatable elements and having an annular armature, and means for urging said armatures and electromagnet apart when said electromagnet is de-energised, the electromagnet and armature each having a cage that supports cams or balls which co-operate with further camming faces on said presser plates to move said pressure plates towards said first and second friction surfaces respectively upon relative angular movement between said electromagnet and/or armature and the presser plates, and the other of said rotatable elements being provided with a first friction member disposed between said first friction surface and said first presser plate, a second friction member disposed between said second friction surface and said second presser plate, and a friction plate disposed between said electromagnet and said armature.

In order that the invention may be clearly understood and readily carried into effect it will now be described in more detail with reference to the accompanying drawings in which—

Figure 1:
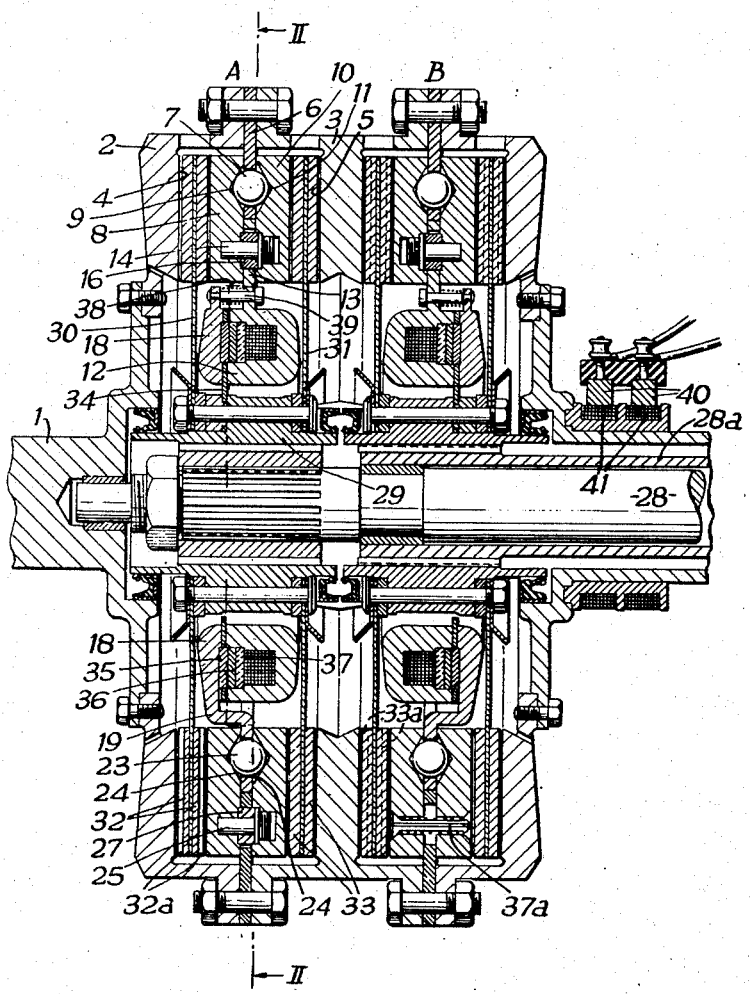
Figure 2:
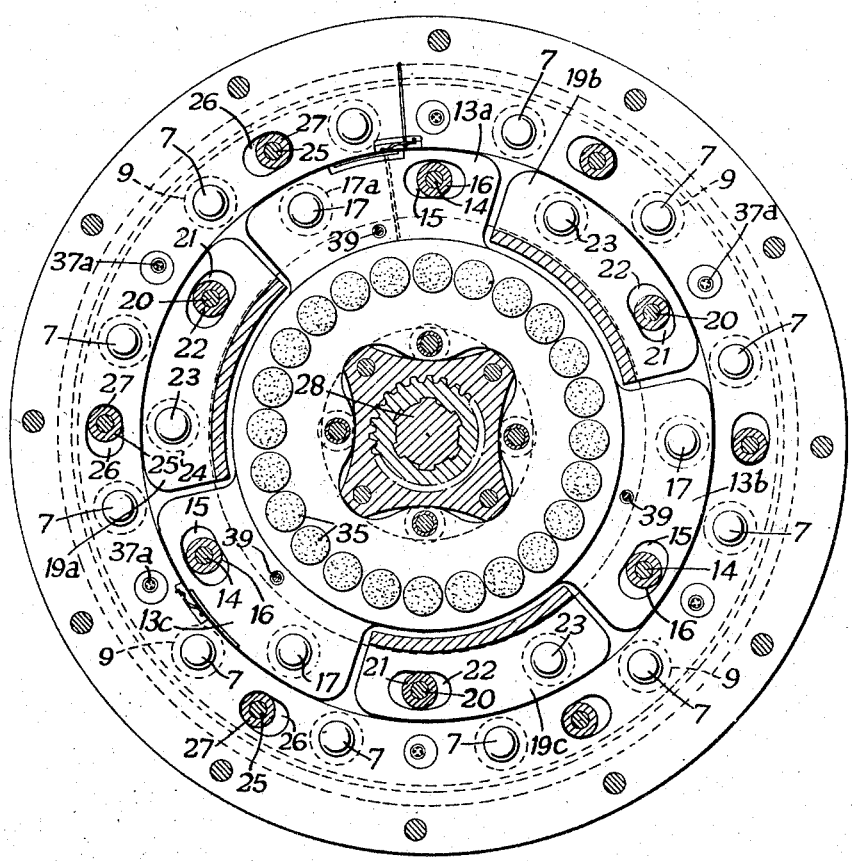

Fig. 1 is a sectional view of mechanism comprising two clutches according to the invention, taken on the axis of the clutches, and Fig. 2 is a sectional view on the line II—II of Fig. 1.

Referring to the drawings, the mechanism comprises two clutches designated generally by the letters A and B, which are alternatively operable to provide power transmission from a shaft 1 selectively to an output shaft 28 or to an output sleeve shaft 28a. The following detailed description relates mainly to clutch A, the construction of clutch B being similar.

One of the above-mentioned rotatable elements comprises the shaft 1, to which is secured an annular casing made in two parts 2 and 3 that are axially separated and which have annular friction surfaces 4 and 5 respectively. The two friction surfaces 4 and 5 face one another and constitute the above-mentioned first and second friction surfaces. Between the two parts of the annular casing is bolted a ring 6 which projects radially inwardly and which is formed with a circular array of round holes, this ring serving as a cage for a plurality of balls 7 of steel or other suitable material, one of which is contained within each of the holes. A first annular presser plate 8 is disposed on one side of the ring 6, this presser plate 8 having a plurality of conical recesses 9 corresponding in number and position to the number and position of the balls 7 carried by the ring 6, and on the other side of the ring 6 is disposed a second annular presser plate 10 which is formed with a like plurality of similar conical recesses 11. The arrangement is such that normally each of the balls 7 is contained within and centrally located with respect to a pocket formed by a pair of conical recesses 9 and 11 in the first and second presser plates 8 and 10 respectively. The conical recesses 8 and 10 provide the above-mentioned camming faces.

An annular electro-magnet 12 is disposed radially inwardly with respect to the presser plates 8 and 10 and coaxial with the shaft 1, the electro-magnet 12 having a three-eared flange 13 which projects radially outwardly and the arcuate ears 13a, 13b, 13c of which are uniformly spaced around the axis of the clutch. The electro-magnet 12 is centred on the presser plates 8 and 10 by means of dowels 14 which are carried by the presser plates and project through holes 15 in the ears 13a, 13b, 13c. These holes 15 are elongated in the angular sense and the dowels 14 carry rollers 16 that are disposed in the holes 15 and are of a diameter slightly smaller than the radial width of the holes 15 and which, due to the elongated form of the holes 15, are capable of limited angular movement therein, rolling on the radially inner surfaces of the holes. The ears 13a, 13b, 13c also constitute a cage for a plurality of steel or other balls 17 which are disposed in circular holes in the ears and which co-operate with camming faces 17a on the presser plates, the last mentioned camming faces being formed by conical recesses in the presser plates 8 and 10. These last-mentioned camming faces are not shown in Fig. 1 but are similar to those already described, viz. the camming faces which co-operate with the balls 7 carried by the ring 6. The electro-magnet 12 has an annular armature 18 provided with a three-eared flange 19, the ears 19a, 19b, 19c of which project radially outwardly and are so shaped and spaced angularly that they are substantially coplanar with the flange 13 of the electro-magnet 12. The armature 19 is centred in the same manner as is the electro-magnet 12, i. e., by means of dowels 20 carried by the presser plates 8 and 10 and projecting through elongated holes 21 in the ears 19a, 19b, 19c, the dowels 20 carrying rollers 22, that are disposed in the holes 21. The armature carries camming balls 23 that co-operate with further camming surfaces formed by conical recesses 24 in the presser plates 8 and 10.

The presser plates 8 and 10 are centred on the ring 6 by means of dowels 25 carried by the presser plates and projecting through elongated holes 26 in the ring 6 and carrying rollers 27 which are of a diameter slightly less than the radial width of these holes 26, the elongated form of which permits limited angular movement of the presser plates with respect to the ring 6. Normally the rollers 27 are disposed at one end of the holes 26, as shown in Fig. 2 and the rollers 16 and 22 which centre the electro-magnet 12 and amature 22 respectively are disposed at the centres of their associated holes, as is also shown in Fig. 2.

The second rotatable element of the clutch or brake is a shaft 28 which is co-axial with the shaft 1 and projects through the above-mentioned annular parts, one end of the shaft 28 being journalled in the end of the shaft 1 as shown in Fig. 1. A hub 29 fixed on the second shaft carries two annular plates 30 and 31 which at their peripheries carry respectively annular friction facing members 32 and 33 which have radial grooves 32a and 33a respectively. The friction facing members 32 on the plate 30 are disposed between hte presser plate 8 and the friction surface 4 of the annular casing 2, and the friction facing members 33 on the plate 31 are disposed between the presser plate 10 and the friction surface 5 of the casing. The hub 29 also carries a friction plate 34 which is of smaller diameter than the two plates 30 and 31 carried by the hub 29 and which projects radially outwardly between the electro-magnet 12 and its armature 18. The friction plate 34 is formed with a circular array of uniformly spaced circular holes in each of which is disposed a button 35 of friction material which is somewhat thicker than the friction plate 34. The buttons 35 co-operate with friction surfaces on the electro-magnet 12 and on the armature 18, the friction surface on the electro-magnet 12 being formed by the outer surface of a ring 36, made from non-magnetic material which is disposed in a circular groove in the face of the electro-magnet opposite the armature, and a heat insulating ring 37 serves to protect the winding of the electro-magnet 12 from heat generated by friction between the buttons 35 and the ring 36 of non-magnetic material.

The presser plates 8 and 10 are normally drawn towards one another by spring links which may, for example, be spring tension links 37a. The armature 18 is normally spaced away from the electro-magnet 12 through the medium of compression springs 38, mounted on studs 39, between the electro-magnet and the armature, so that the armature 18 is normally out of frictional engagement with the friction buttons 35.

In operation, so long as the electro-magnet 12 is deenergised there is no driving connection between the shafts 1 and 28 since the presser plates 8 and 10 are urged towards one another and are therefore out of frictional engagement with the friction facing members 32 and 33, and the armature 18 is held by the compression springs 38 in a position in which there is no frictional engagement between the armature 18 and the friction buttons 35 on the one hand and between the friction buttons 35 and the friction ring 36 on the other hand.

When the electro-magnet 12 is energised (which may be effected by any suitable means know per se, for example brushes 40 and slip rings 41), the armature 18 is attracted and the friction buttons 35 are clamped between the armature 18 and the friction ring 36, thereby establishing an initial frictional connection between the shaft 28 and the flanges 13 and 19 on the electro-magnet and the armature respectively, so that the presser plates 8 and 10 are cammed apart by the interaction of the balls 17 and 22 and their associated camming faces into initial engagement with the friction facing members 32 and 33, the frictional drag of which is additive to the initial frictional connection above-mentioned, so that these frictional effects together tend to turn the presser plates 8 and 10 angularly with respect to the outer casing 2. Due to the interaction of the balls 7 carried by the ring 6 and the camming faces in the presser plates 8 and 10 the latter are more firmly cammed apart, thereby clamping the friction facing members 32 and 33 against the friction surfaces on the casing 2. The shafts 1 and 28 are thereby drivably coupled to one another. The frictional force which provides the said initial driving connection is substantially proportional to the torque transmitted through the brake or clutch.

The balls 7 and the associated camming faces in the ring 6 provide what may be termed a "secondary servo action" which in the example described is uni-directional due to the rollers 27 being normally at one end of the elongated holes 26 in the ring 6. If a bi-directional secondary servo action is required the rollers 27 will normally be centrally disposed in the holes 26.

With electromagnet 12 of clutch A de-energised and the electro-magnet of clutch B energised, a driving connection is established between shaft 1 and output sleeve shaft 28a. It will be clear that the mechanisms described can be employed as brakes instead of clutches. It is convenient to make the casing part 3 common to both clutches or brakes, as shown.

I claim:

An electromagnetically actuated friction clutch or brake comprising two relatively rotatable elements, one of which is provided with first and second friction surfaces disposed co-axially and spaced apart, a cage disposed between said first and second friction surfaces, a first presser plate disposed between said cage and said first friction surface, and a second presser plate disposed between said cage and said second friction surfaces, said cage carrying cams or balls which co-operate with camming faces on said presser plates whereby to displace said presser plates axially towards said first and second friction surfaces respectively upon relative angular movement between said cage and said presser plates, said presser plates carrying an annular electro-magnet disposed coaxially with respect to said rotatable elements and having an annular armature and means for urging said armature and electromagnet apart when said electromagnet is de-energised, the electromagnet and armature each having a cage that supports cams or balls which co-operate with further camming faces on said presser plates to move said presser plates towards said first and second friction surfaces respectively upon relative angular movement between said electromagnet and/or armature and the presser plates, and the other of said rotatable elements being provided with a first friction member disposed between said first friction surface and said first presser plate, a second friction member disposed between said second friction surface and said second presser plate, and a friction plate disposed between said electromagnet and said armature.

References Cited in the file of this patent

UNITED STATES PATENTS 2,658,593   Doebeli _____ Nov. 10, 1953

FOREIGN PATENTS 599,540   Great Britain _____ Mar. 15, 1948